United States Patent [19]

Ogisu

[11] 3,807,762
[45] Apr. 30, 1974

[54] PORTABLE BICYCLES

[75] Inventor: Noriyuki Ogisu, Tokyo, Japan

[73] Assignee: Nichibei Fuji Cycle Co., Ltd., Tokyo, Japan

[22] Filed: June 19, 1972

[21] Appl. No.: 264,391

[30] Foreign Application Priority Data
Aug. 3, 1971 Japan.............................. 46-68736

[52] U.S. Cl. ............................................. 280/287
[51] Int. Cl. ............................................. B62k 3/02
[58] Field of Search..................... 280/281, 287, 288

[56] References Cited
UNITED STATES PATENTS
2,993,709 7/1961 Wick............................ 280/287
FOREIGN PATENTS OR APPLICATIONS
494,574 7/1950 Belgium............................ 280/287
511,944 6/1952 Belgium............................ 280/287
78,321 11/1949 Norway............................ 280/287

Primary Examiner—M. Henson Wood, Jr.
Assistant Examiner—Michael Y. Mar
Attorney, Agent, or Firm—Toren, McGeady and Stanger

[57] ABSTRACT

A collapsible bicycle comprising a body including a frame assembly and a handle assembly, and a front and rear wheels rotatably mounted on the body, the improvement comprises that said frame assembly including a substantially horizontal main tube having a head tube secured at the front end thereof for connection with said handle assembly, a seat stay which is secured to a back stay and a chain stay for supporting said rear wheel, and means for releasably securing said seat stay to said main tube in such a manner that, in a released position, it allows the seat stay to slide along the length of the main tube whereby the whole length of the bicycle can be shortened.

5 Claims, 13 Drawing Figures

PORTABLE BICYCLES

This invention relates to portable bicycles which can be collapsed and assembled by "one-touch" operation without requiring any tool.

An object of the present invention is to provide a portable bicycle in which a main tube is slidable relative to a seat tube, so that the overall length of the bicycle can be shortened by sliding the main tube relative to the seat tube. In order to achieve this object, according to the present invention, the portable bicycle is characterized in that the main tube can be freely slided or fixed in position relative to the seat tube only by operating a lever, whereby the storage and transportation of the bicycle is facilitated and the dimension of a wheel base can be changed according to the purpose of use of the bicycle, and particularly in that either one of two frames, i.e., upper and lower frames, which clamp the main tube is fixed to the seat tube, and a lever pivoted to said fixed frame and the other frame not fixed to said seat tube are connected by a connecting lever. By constructing the bicycle as described above, the main tube is clamped between the upper and lower frames, the interval of which can be varied by operating the lever, so that the main tube can be fixed in position or set free only by the operation of the lever and the dimension of the wheel base can be changed upon sliding the main tube without using any tool.

Another object of the invention is to provide a portable bicycle in which a handle is divided into two sections and the height of the handle can be made extremely low. In order to achieve this object, according to the invention, the portable bicycle is constructed such that assembly or disassembly of the two handle sections or handle bars, adjustment of the height of handle posts and rotation of the handle posts about their own axes may be achieved solely by tightening or loosening a tension rod extending through lugs of clamping brackets and an arm upon turning said tension rod at one end thereof, which is highly simple in operation, and furthermore connection of said handle bars is effected by the engagement between holes each formed through each of adapters which are complementary in shape with substantially the halves of the outer periphery of the handle bars and projecting from the connecting ends of the handle bars in such a manner as will be mated together to embrace said connecting ends the handle bars when said handle bars are connected together at said ends, respectively, and projections each provided on each of the connecting end portions of the handle bars, so that when the handle bars are connected together, the connected portions of the handle bars will have a double-walled structure and thus a rigid connection will be obtained.

Still another object of the invention is to provide a portable bicycle in which the height of a seat can be optionally adjusted by operating a seat adjusting lever. In order to achieve this object, according to the invention a seat post is slidably telescoped into a seat tube and a supporter is connected to the upper end of the seat tube and further a pusher and a seat lever are disengageably mounted on said supporter.

Now, the present invention will be described in further detail with reference to an embodiment thereof shown in the accompanying drawings, in which.

Figure 1:
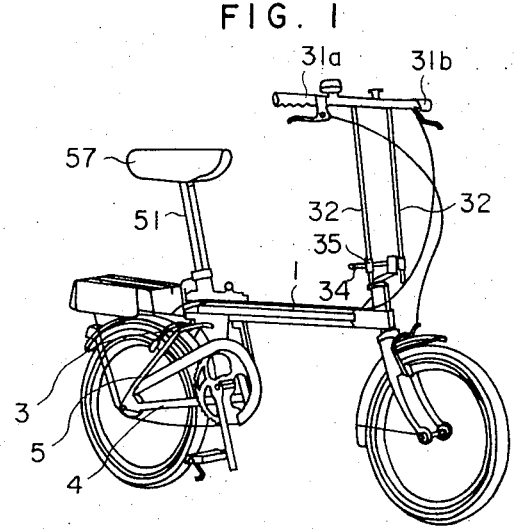
FIG. 1 is a perspective view of a portable bicycle according to the present invention.
Figure 2:
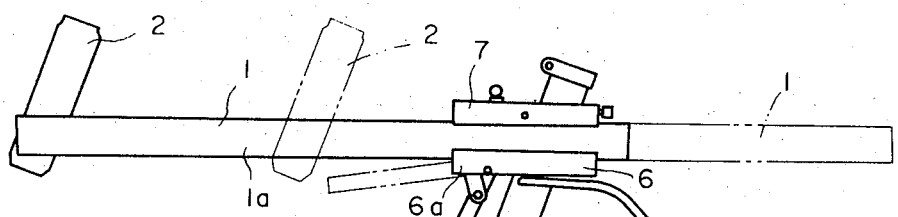
FIG. 2 is a side view of the main tube of the bicycle in an assembled state.
Figure 3:
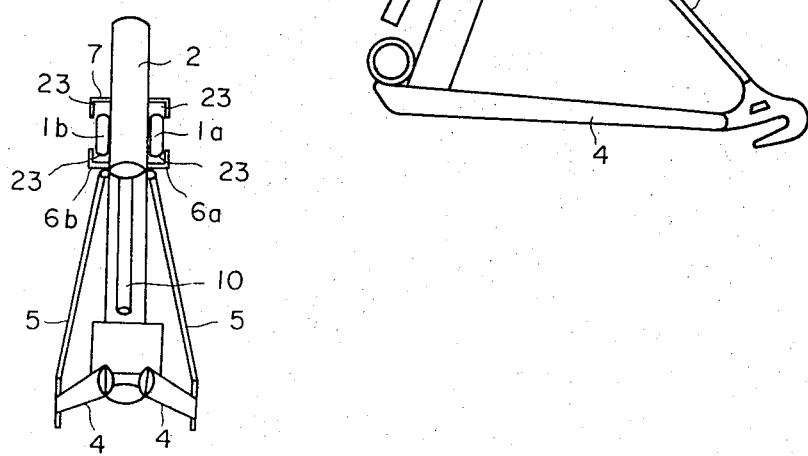
FIG. 3 is a front view of FIG. 2.
Figure 5:
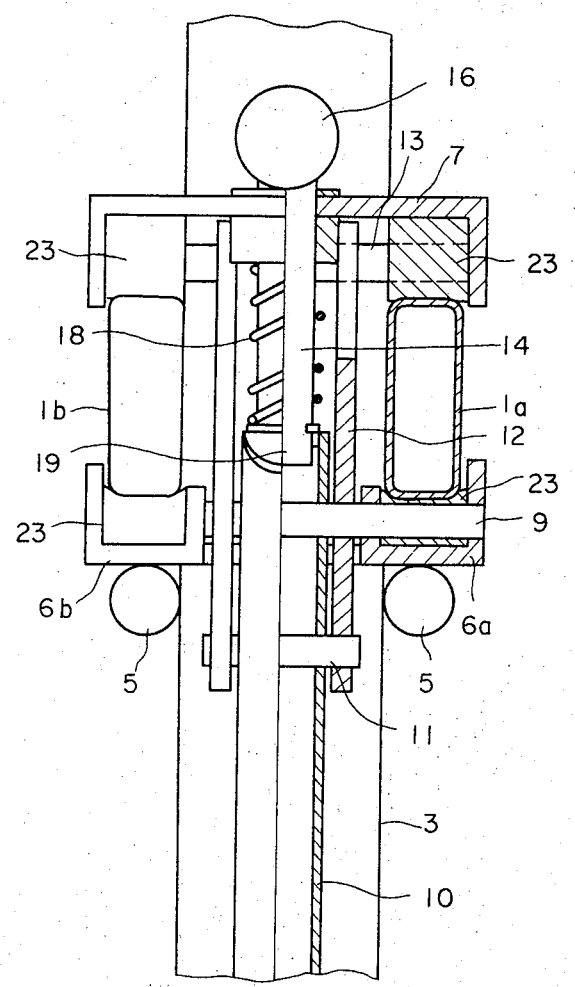
FIG. 5 is a sectional view along the line V—V of FIG. 4.

Referring first to FIGS. 1 and 2, there is shown a collapsible bicycle comprising front and rear wheels $W_F$ and $W_R$, and a body B including a handle assembly H and a frame assembly F. The frame assembly F comprises a main tube 1, a head tube 2 fixed to the forward end of said main tube 1, a seat tube 3, and a chain stay 4 and a back stay 5 which are connected to said seat tube 3. In this embodiment, as shown in FIGS. 3 and 5, the main tube 1 consists of two parallel tubes 1a, 1b arranged on both sides of the seat tube 3 to clamp said seat tube. The two main tubes 1a, 1b are clamped at the upper and lower sides thereof by lower and upper frames 6, 7 each being of a U-shaped cross section. The lower frame 6 is bifurcated and has two arms 6a, 6b extending on both sides of the seat tube 3 to support the two main tubes 1a, 1b from the underside respectively, said arms 6a, 6b being fixed to said seat tube 3 as by welding. The upper frame 7 depresses the two main tubes 1a, 1b from the upper side and is formed with a through-hole 8 therein through which the seat tube 3 extends.

Figure 4:
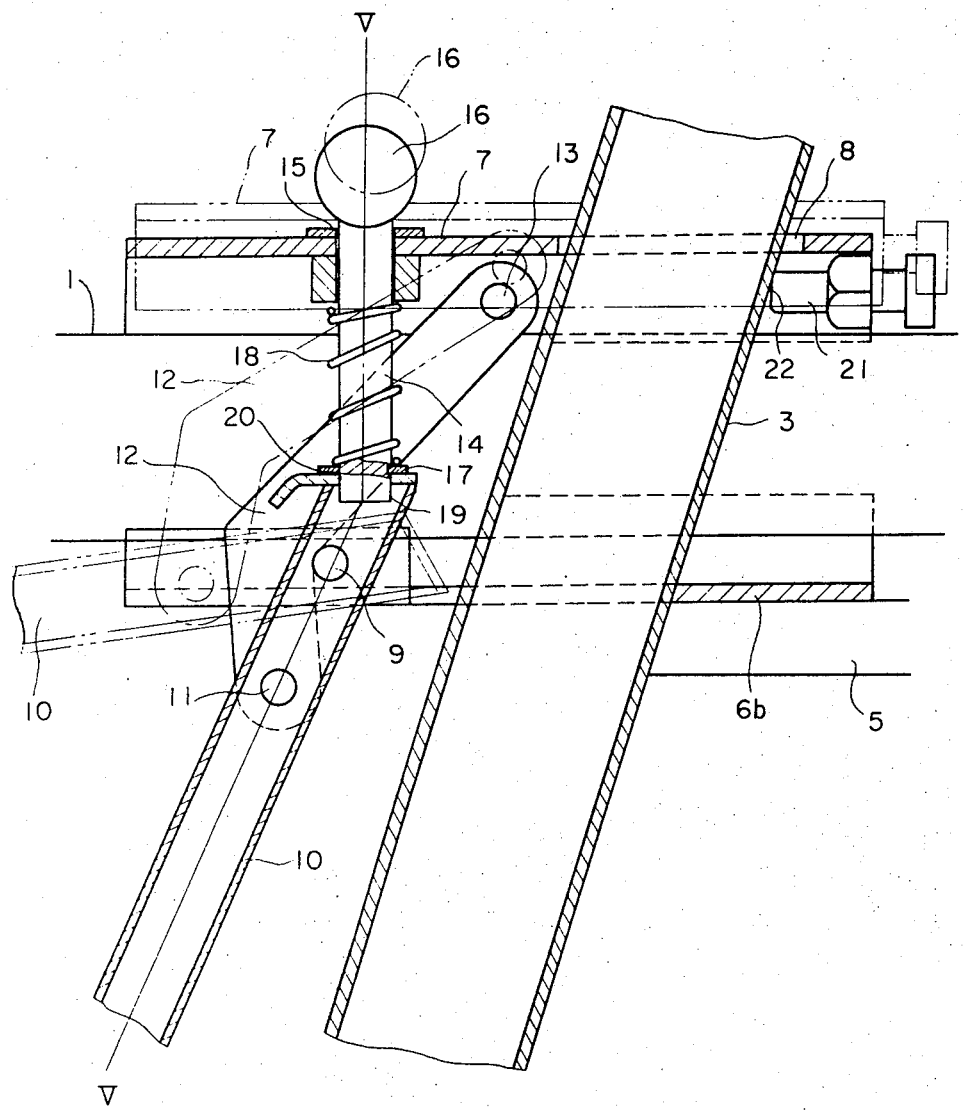
FIG. 4 is a sectional view showing the details of the main tube fixing means.

Between the arms 6a, 6b of the lower frame 6 which are secured to the seat tube 3 is pivotally connected a lever 10 by means of a pin 9 as shown in FIG. 4 and one end of a connecting lever 12 is pivotally connected to said lever 10 by a pin 11. The other end of the connecting lever 12 is pivotally connected to the upper frame 7 by a pin 13. Thus, it will be understood that, when the lever 10 is pivotally rotated in a clockwise direction about the pin 9, the upper frame 7 is moved upwardly by the connecting lever 12 to the position indicated by the phantom line in FIG. 4 so that the main tube 1 is released from the clamping forces of the lower and upper frames 6, 7 and becomes slidable between the lower and upper frames 6, 7, whereas when the lever 10 is pulled to make a pivotal movement in a counterclockwise direction, the upper frame 7 is pulled downwardly tightly clamping the main tube 1 between it and the lower frame 6 to fix said main tube 1 in position.

A stopper pin 14 is extending in the space between the lower and upper frames 6, 7 through a hole 15 formed in the upper frame 7. This stopper pin 14 is provided at its upper end with a handle 16 located above the upper frame 7 and has a flange 17 formed at its lower end portion, and is constantly urged downwardly by a spring 18 mounted therearound between said flange 17 and the upper frame 7, with its lower end 19 being received in a hole 20 formed in the upper end of the lever 10. Thus, the stopper pin 14 serves as safety means to prevent return movement of the lever 10. Therefore, when it is desired to rotate the lever 10, it is necessary to previously disengage the lower end 19 of the lever 10 from the hole 20 by pulling the stopper pin 14 upwardly upon grasping the handle 16.

At one end of the upper frame 7, there is provided an adjusting screw 21 which is arranged such that its end 22 abuts against the seat tube 3. This adjusting screw 21 is provided to adjust the main tube tightening force by the lever 10. Reference numeral 23 designates rubber packings which are respectively disposed in the U-shaped cavities of the lower and upper frames 6, 7 to ensure positive engagement between the main tube 1 and said lower and upper frames 6, 7.

Although in this embodiment, the main tube 1 consists of two tubes 1a, 1b, it is to be understood that said main tube may be a single tube and the seat tube 3 crossing said main tube may be composed of two parallel tubes. It is also to be understood that, when the upper frame 7 is fixed to the seat tube 3 as by welding, the lever 10 may be pivotally connected to the upper frame 7 and the connecting lever 12 may be connected between the lower frame 6 and the lever 10.

Figure 6:
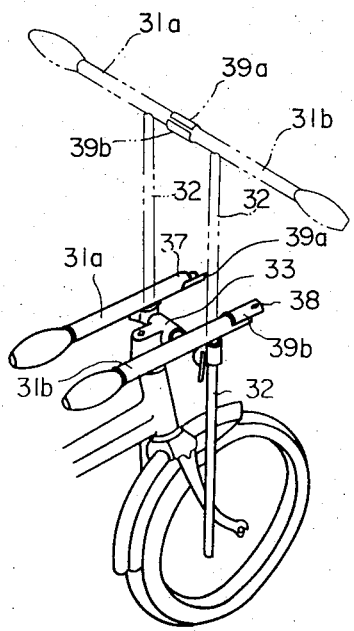
FIG. 6 is a perspective view of the handle of the bicycle, in which the solid lines indicate the positions of the handle bars in a folded state of the bicycle and phantom lines indicate the positions of the same in an assembled state of the bicycle.
Figure 7:
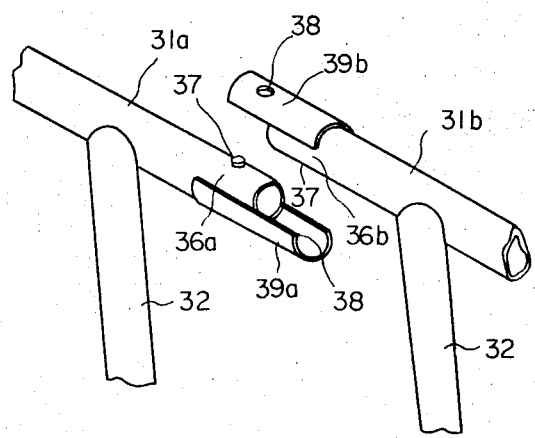
FIG. 7 is an exploded perspective view of the handle.
Figure 8:
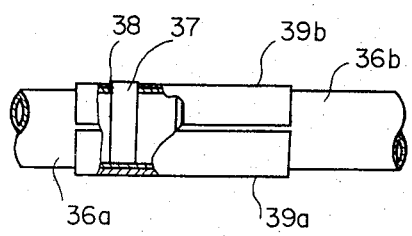
FIG. 8 is a fragmentary sectional view of the handle showing the manner in which the handle bars are connected together.

According to another aspect of the invention, as shown in FIGS. 6 and 7, the handle assembly H comprises a handle bar 31 including two sections 31a, 31b and handle bar supporting posts 32 connected to the handle bar sections 31a, 31b respectively. At the connecting ends 36a, 36b of the handle bars 31a, 31b are respectively provided with adapters 39a, 39b of a shape complementary to substantially the halves of the outer shape of the connecting end portions of said handle bars, which are projecting toward each other from said connecting ends 36a, 36b in such a manner that they are mated together to embrace the joint of said handle bars as shown in FIG. 8 when said handle bars are connected with each other. In this embodiment, the handle bars are circular in shape and, therefore, the adapters 39a, 39b are semicylindrical in shape respectively. The connecting end portions 36a, 36b of the handle bars 31a, 31b are each provided with a projection 37, while the adapters 39a, 39 b are each provided with a hole 38. These projections 37 are received in the opposite holes 38 respectively as shown in FIG. 8 when the handle bars 31a, 31b are connected with each other.

Figure 9:
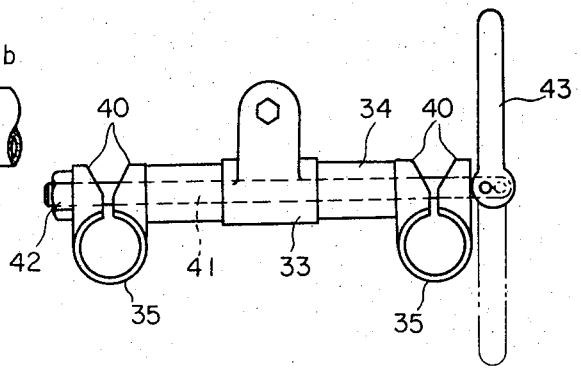
FIG. 9 is a plan view of the handle post supporting portion of the handle.

Further, as shown in FIGS. 6 and 9, the handle bar supporting posts 32, 32 are supported respectively by clamping brackets 35, 35 which are provided at the opposite ends of an arm 34 supported by a post lug 33, and a tension rod 41 is extended through lugs 40 of said clamping brackets 35, 35 and said arm 34. One end of the tension rod 41 is projected outwardly from one of the clamping brackets 35 and provided with a lever 43. The clamping brackets 35, 35 can be concurrently tightened or loosened by operating the lever 43, whereby the handle bar supporting posts 32, 32 are fastened or loosened. Instead of providing the lever, a wing nut may be mounted on the projecting end of the tension rod 41 for tightening said rod.

The manner of assembling and disassembling the handle portion constructed as described above will be explained with reference to FIGS. 7 and 8. The handle bars 31a, 31b are connected with each other by the adapters 39a, 39b which are of a shape complementary to substantially the halves of the outer periphery of the handle bars and provided at the connecting ends 36a, 36b of said handle bars in opposed relation to each other, and the projections 37 provided at said connecting ends and the holes 38 formed in said adapters respectively. Namely, the adapter 39a is fitted over the connecting end portion of the opposite handle bar 31b with the projection 37 on said handle bar being engaged in the hole 38, while the adapter 39b is fitted over the connecting end portion of the other handle bar 31a with the projection 37 on said handle bar being engaged in the hole 38 formed in said adapter 39b, in the manner shown in FIG. 8. Since the adapters 39a, 39b are provided in opposed relation to each other, the joint of the handle bars 31a, 31b will have a doublewalled structure. When it is desired to disconnect the handle bars, this may be achieved simply by disengaging the projections 37 from the respective holes 38.

The handle bar supporting posts 32, 32 to be connected to the handle bars 31a, 31b are extended through the clamping brackets 35, 35 at the opposite ends of the arm 34 supported by the post lug 33, and are fixed in their positions by tightening the tension rod 41, extending through the lugs 40, 40 of said clamping brackets and the arm 34, at one end thereof. Conversely, the handle bar supporting posts can be relaxed concurrently by loosening the tension rod 41. Namely, the two clamping brackets 35, 35 can concurrently fasten or loosen the handle bar supporting posts 32, 32. For disconnecting the handle bars 31a, 31b, the handle bar supporting posts 32, 32 are relaxed at first and for connecting the handle bars the handle bar supporting posts 32, 32 are fastened after said handle bars are joined with each other.

Figure 10:
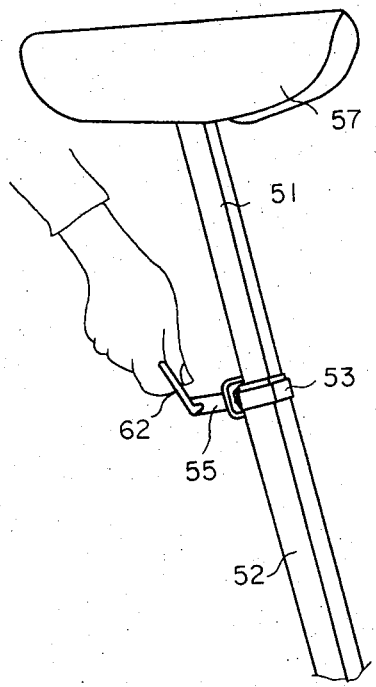
FIG. 10 is a perspective view of the seat of the bicycle.
Figure 11:
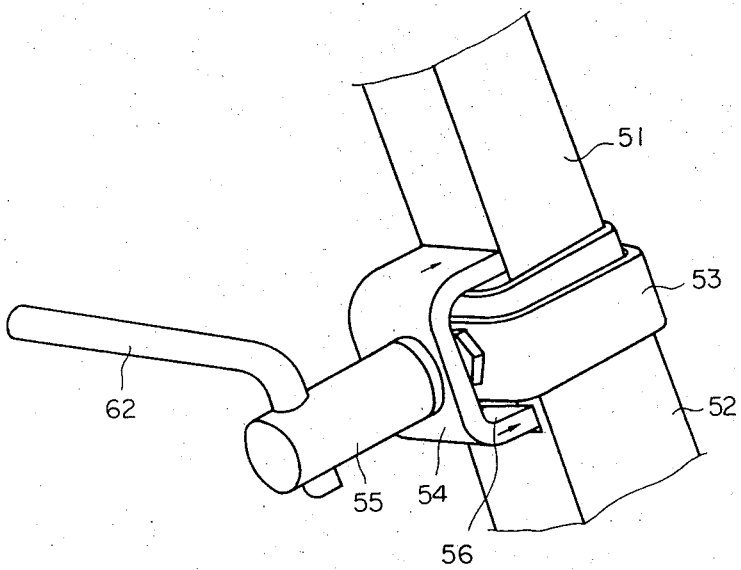
FIG. 11 is a perspective view of the essential portion of the seat.
Figures 12, 13:
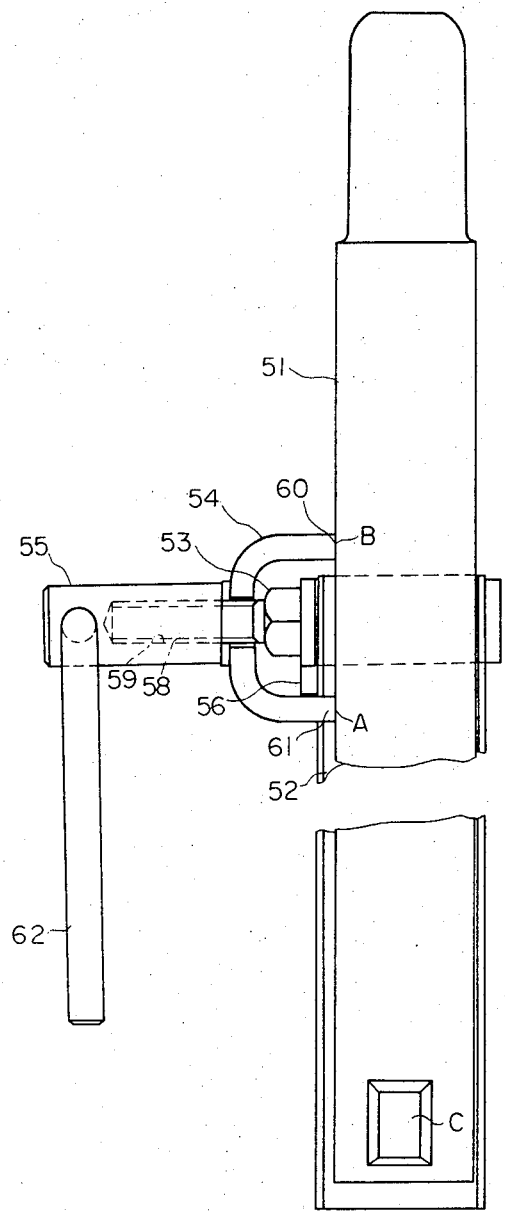
FIG. 12 is a sectional view, partially broken away, of the essential portion of the seat.
FIG. 13 is a fragmentary side view showing only the lower portion of FIG. 12.

According to still another aspect of the invention, as shown in FIGS. 11 and 12, the seat post 51 having a seat 57 fixed to the upper end thereof as shown in FIG. 10 is slidably telescoped into the seat tube 52 which corresponds to the seat tube designated by numeral 3 in FIGS. 2, 4 and 5, and fixed in position by fixing means comprising a supporter 53, a metal clamp 54, a seat lever 55 and a stopper 56. The supporter 53 is mounted on the seat tube, surrounding the upper end thereof and has an externally threaded rod 58 connected thereto, which is screwed into a bottomed internally threaded hole 59 in the seat lever 55. The metal clamp 54 has a channel shape and is mounted on the threaded rod 58 of the supporter 53 with the latter extending through a hole formed therein. The clamping metal 54 when tightened by the seat lever 55 moves in the direction indicated by the arrow in FIG. 11, and one of legs 60 thereof is brought into direct contact with the seat post 51 and the other leg 61 thereof is brought into contact with the seat post 51 through the seat tube 52. This can be achieved by rotating a rod 62 of the seat lever 55 by the hand. In order to prevent lateral displacement of the seat post 51, lands 63 are formed at the lower portion of said seat post 51.

I claim:

1. A collapsible bicycle comprising a body including a frame assembly and a handle assembly, and a front wheel and a rear wheel rotatably mounted on said body, wherein the improvement comprises that said frame assembly includes a substantially horizontal main tube, a head tube secured at the front tube of said main tube and arranged to receive said handle assembly, a seat stay, a back stay, and a chain stay secured to said seat stay for supporting said rear wheel, means for releasably securing said seat stay to said main tube, so that in the released position said seat stay is slidably displaceable along the length of said main tube so that the wheel base of the bicycle can be variably adjusted, said main tube comprises a pair of parallel tube elements, each disposed on an opposite side of said seat stay, and said releasable securing means includes a pair of opposed upper and lower frames, one of said upper and lower frames being secured to said seat stay and means arranged for yieldably forcing the other said frame toward the one of said frames secured to said seat stay for clamping said main tube therebetween.

2. A collapsible bicycle, as set forth in claim 1, wherein said releasable securing means includes means for moving the other said frame apart from the one of said frames for releasing clamping force on said main tube.

3. A collapsible bicycle, as set forth in claim 1, wherein locking means are releasably engageably with said releasable securing means for releasably locking the upper and lower frames in clamping position.

4. A collapsible bicycle, as set forth in claim 1, wherein said seat stay comprises a hollow tube, and a seat post arranged to telescopically fit into said hollow tube, and means arranged for releasably locking said seat post to said hollow tube.

5. A collapsible bicycle, as set forth in claim 1, wherein said handle assembly comprises a handle, said handle includes two handlebar sections, a supporting post connected to each of said handlebar sections, a post lug connected to said head tube, an arm supported in said post lug and means for releasably securing said supporting posts to said arm, said handlebar sections being releasably connectible for displacement between an operative position with said handlebar sections aligned and connected together and a collapsed position with said handlebar sections disconnected and displaced angularly from the operative position.

* * * * *